United States Patent
Davino

[15] 3,680,949
[45] Aug. 1, 1972

[54] RELIEF ILLUSION TELEVISION VIEWING APPARATUS

[72] Inventor: Salvatore Davino, 818 S. Loomis St., Chicago, Ill. 60607

[22] Filed: March 25, 1971

[21] Appl. No.: 128,094

Related U.S. Application Data

[63] Continuation-in-part of Ser. No. 830,281, June 4, 1969, abandoned.

[52] U.S. Cl. .................... 350/144, 350/190, 352/86
[51] Int. Cl. ...... G02b 27/22, G02b 3/06, G02b 13/18
[58] Field of Search ................ 350/144, 190; 352/86

[56] References Cited

UNITED STATES PATENTS 3,536,832  10/1970  Zypse et al. .................... 350/144

*Primary Examiner*—David Schonberg
*Assistant Examiner*—Paul A. Sacher
*Attorney*—Hume, Clement, Hume & Lee

[57] ABSTRACT

There is disclosed a television viewing apparatus especially adapted to provide an illusion to the user of three-dimensional images comprising: a housing having a first aperture adapted for alignment with the eyes of the user and a second aperture adapted for alignment with a television screen; a convex arcuate segment of transparent material substantially adjacent to the first aperture; a first concave arcuate segment of transparent material substantially adjacent to the second aperture; and a second concave arcuate segment of transparent material and intermediate to the convex arcuate segment of transparent material and to the first concave arcuate segment of transparent material cooperate to deflect the image received from the television screen and provide an illusion of three-dimensional images to the user.

11 Claims, 3 Drawing Figures

PATENTED AUG 1 1972 3,680,949
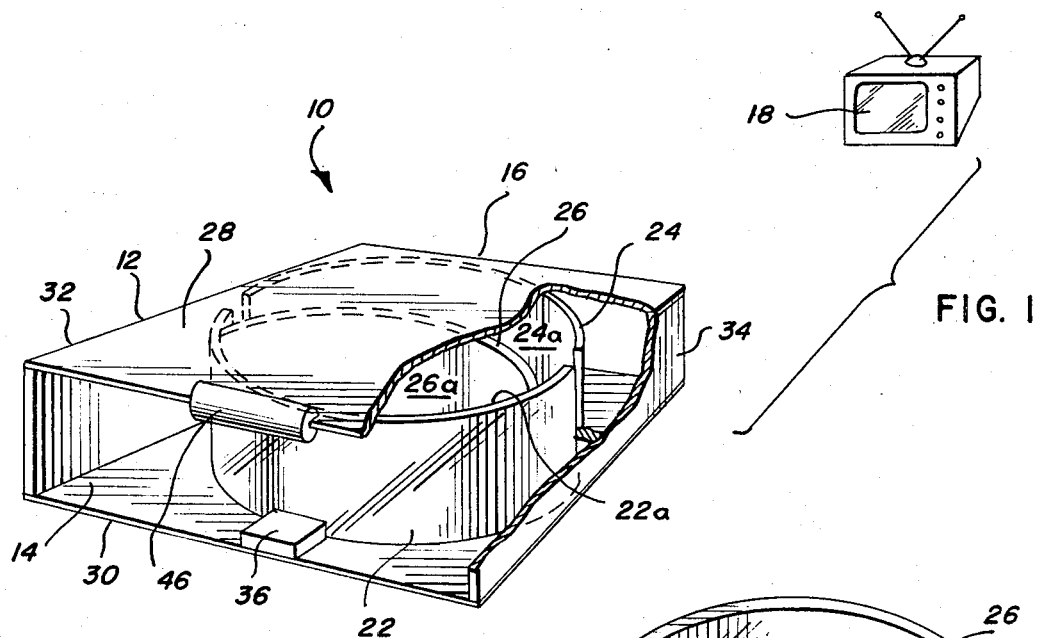
FIG. 1
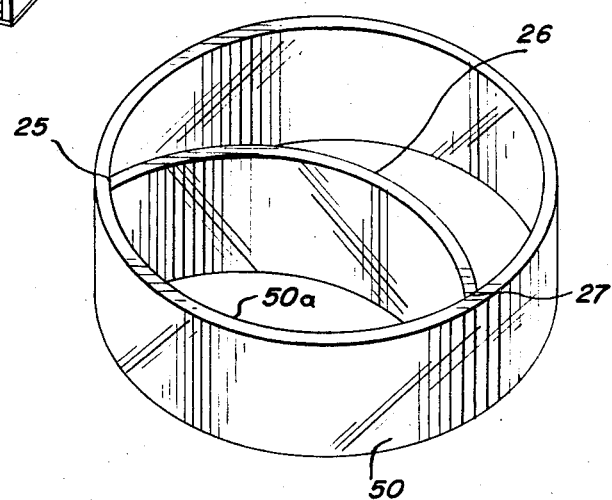
FIG. 3
FIG. 2
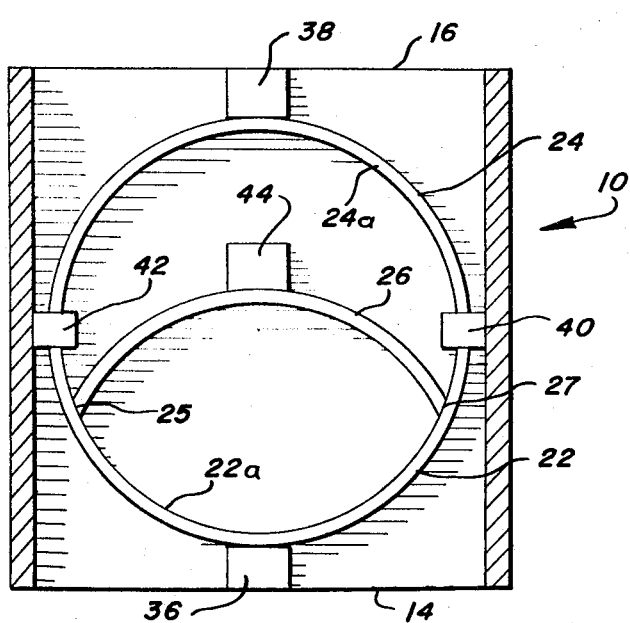
INVENTOR
SALVATORE DAVINO
BY Roy E. Hofer
Jack C. Berenzweig
ATTORNEYS

RELIEF ILLUSION TELEVISION VIEWING APPARATUS

CROSS-REFERENCES TO RELATED APPLICATIONS

This application is a continuation-in-part of application Ser. No. 830,281, filed June 4, 1969, and now abandoned for Third-Dimensional Viewing.

BACKGROUND OF THE INVENTION

The present invention relates to a viewing apparatus and, more particularly, to a viewing apparatus which is adapted to provide an illusion to the user of three-dimensional images.

There exists several different methods which provide a means for looking at a two-dimensional figure and perceiving the illusion of a three-dimensional image. One such method utilizes a specially designed apparatus for the examination of photographic film. Normally, the photographer would photograph two pictures, slightly spaced apart, using a special camera, which would simulate the normal human binocular vision. These two pictures are then viewed through a special viewer called a stereoscope and the brain reacts to the two views as it would to the object itself and, therefore, sees a three-dimensional image. One such stereoscope is disclosed in U.S. Pat. No. 3,502,390, issued Mar. 24, 1970.

A second method for providing the illusion of three dimension is through the use of polarized viewing glasses. In this method, a three-dimensional scene is generally photographed by two separate cameras located a given distance apart, corresponding to the distance between a person's eye. The resulting images on each film are thus seen as would be viewed by each eye of the observer, respectively. These images are projected through a suitable filtering means such as complimentary color filters or polarized light. By employing suitable viewing glasses containing filters whereby one eye sees one image only and the other eye sees the other image only, the scene will appear on the screen in much the same manner as viewed in real life and thus, providing a three-dimensional effect.

A third method for providing three-dimensional images utilizes a stereoscope apparatus which are designed specifically for use with television screens and is disclosed in U.S. Pat. No. 3,293,358, issued Dec. 20, 1966. In this method, the television screen is specially designed with a pair of lenses to give the illusion of a three-dimensional image. Another similar device is disclosed in U.S. Pat. No. 2,884,833, issued May 5, 1959.

Although such methods have served the purpose, they have not proved entirely satisfactory under all conditions of service for the reason that in each instance, it is necessary to either modify the television screen or to provide two side-by-side simultaneous images in order to create the illusion of three-dimensional viewing. The present invention overcomes these difficulties.

SUMMARY OF THE INVENTION

The present invention contemplates a unique viewing apparatus comprising a housing means having a first aperture adapted for alignment with the eyes of the user and a second aperture adapted for alignment with the television screen. A first lens is positioned within the housing and substantially adjacent to the first aperture and a second lens is positioned within the housing and substantially adjacent to the second aperture. A third lens is located intermediate to the first and second lens wherein the three lenses cooperate to deflect the image received from a television screen and provide an illusion of three-dimensional images to the user.

It is, therefore, an object of the present invention to provide a television viewing apparatus which is economical to manufacture and which provides an illusion to the user of three-dimensional images without necessitating the modification of the television itself.

Another object is to provide a three-dimensional viewing apparatus which does not require the use of side-by-side two-dimensional pictures and which does not require the use of special filters.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a perspective view, partly in section, of a television viewing apparatus which constitutes the preferred embodiment of the invention, shown in relation to a television screen.

FIG. 2 is a top sectional view of the apparatus shown in FIG. 1.

FIG. 3 is a perspective view of an alternative embodiment of the invention.

DESCRIPTION OF THE PREFERRED EMBODIMENT

Referring now to the drawings wherein like reference characters designate like or corresponding parts throughout the several views, there is shown in FIGS. 1 and 2 a television viewing apparatus 10, in accordance with the present invention, which is adapted to provide an illusion to the user of three-dimensional images. The television viewing apparatus 10 comprises a hollow housing 12 having an aperture 14 on one end which is adapted for alignment with the eyes of the user and a second aperture 16 on the opposite end which is adapted for alignment with a television screen 18.

In the preferred embodiment, the housing 12 of the television viewing apparatus 10 comprises a hollow box-like structure having an opaque top panel 28 and an opaque bottom panel 30. A pair of opaque side walls 32 and 34 are provided perpendicular to the top panel 28 and the bottom panel 30. The apertures 14 and 16 are provided by leaving the remaining two sides of the hollow box-like housing 12 open. However, it will be recognized that additional panels may be placed over these openings and apertures inserted within these panels. It will also be recognized that the top panel 28, bottom panel 30 and the side walls 32 and 34 may be manufactured from any suitable material such as wood, plastic or paper-board and the shape of the housing is not critical to the practice of the invention and many modifications may be made within the spirit and scope of the invention.

Inserted within the housing 12 is a first lens 22 positioned adjacent to the aperture 14 and a second lens 24 which is positioned adjacent to the aperture 16. A third lens 26 is positioned intermediate to the lens 22 and the lens 24. As clearly shown in FIGS. 1 and 2, the lens 22 comprises a convex arcuate segment of transparent material having a uniform width. The lens 22 has an inner surface 22a which faces towards the aperture 16. In the preferred embodiment, the transparent material comprises a plastic-like substance; however, it will be recognized by one skilled in the art that any other transparent material may be utilized such as glass. The lens 24 and the lens 26 each comprise a concave arcuate segment of transparent material having a uniform width. The lens 24 has an inner surface 24a which is oriented to face towards the aperture 14 and the lens 26 has an inner surface 26a which is also oriented to face towards the aperture 14. In the preferred embodiment, the radius of curvature of the lens 26 is substantially equal to the radius of curvature of the lens 22 which is equal to the radius of curvature of the lens 24. Lastly, the ends 25 and 27 of the lens 26 are oriented in a manner so that they are placed in contact with the inner surface 22a of the lens 22 so that the main chord formed thereby is parallel to the plane of the aperture 14.

In order to insure for the proper positioning and orientation of the lenses 22, 24 and 26, several guide means are provided on the interior of the housing 12. A guide means 36 is provided to insure that the lens 22 is substantially adjacent to and spaced a preselected finite distance from the aperture 14 while a guide means 38 insures that the lens 24 is substantially adjacent to and spaced a preselected finite distance from the aperture 16. These finite distances are not critical to the operation of the viewing apparatus 10; however, if the lenses 22 and 24 were in the same planes as the apertures 14 and 16, they would be subject to scratching. Two additional guide means 40 and 42 are present on the interior of the housing 12 to provide a proper spacing between the ends of the lens 22 and the ends of the lens 24. However, while the ends of the lens 22 and the lens 24 are spaced apart, this is not entirely necessary for the proper operation of the viewing apparatus 10 as will be explained below with reference to FIG. 3. Lastly, a guide means 44 is provided to insure that the ends 25 and 27 of the lens 26 are placed in contact with the inner surface 22a of the lens 22 and a guide means 46 on the exterior of the housing 12 is provided to aid the user in aligning the viewing apparatus 10 with his eyes.

As explained above, in reference to FIGS. 1 and 2, the lenses 22 and 24 were separated by a finite distance as determined by the guide means 40 and 42. However, this is not entirely necessary and the two lenses 22 and 24 may be connected together to form a substantially cylindrical element as shown in FIG. 3. Referring now to FIG. 3, which constitutes an alternative embodiment of the invention, there is shown a transparent cylindrical element 50. Preferably, the cylindrical element 50 is constructed as a single piece; however, it may also comprise two individual segments connected together. The cylindrical element 50 is placed in a housing similar to the housing 12 shown in FIG. 1, in such a manner that the longitudinal axis of the cylindrical element would be placed parallel to the planes formed by the apertures 14 and 16 or, in other words, the longitudinal axis of the cylindrical element is perpendicular to the top panel 28 and the bottom panel 30 of the housing 12. In this manner, the cylindrical element 50 replaces the lenses 22 and 24 in the viewing apparatus 10. Lastly, as shown in FIG. 3, the lens 26 is placed within the cylindrical element 50 such that the ends 25 and 27 of the lens 26 are in contact with the inner surface 50a of the cylindrical element 50. It can clearly be seen that the cylindrical element 50 and the lens 26 cooperate in the same manner that the lens 22, 24 and 26 cooperate in order to provide the illusion of three-dimensional images.

The operation of the viewing apparatus 10 will now be explained with reference to FIGS. 1 and 2. However, it will be recognized by one skilled in the art that the operation of the embodiment shown in FIG. 3 would be identical. In operation, the user would hand-hold the housing 12 of the television viewing apparatus 10 in such a manner that the eyes of the user would look through the aperture 14 while the aperture 16 would be in alignment with the television screen 18. The image emanating from the television screen 18 would pass through the aperture 16 and through the lens 24. The lens 24, because of its finite thickness and because of its radius of curvature, causes a deflection of the light rays passing through. The image rays that pass through the left and right sides of the lens 24 are deflected a greater amount than the image rays passing through the center of the lens 24 because of the curvature of the lens 24. After passing through the lens 24, the image rays then pass through the lens 26 and are again similarly deflected. Lastly, the image rays pass through the lens 22 and are deflected through the aperture 14 toward the eyes of the user. This total deflection of the image rays due to the cooperation of the lenses 22, 24 and 26 cause each of the eyes of the user to see the object from slightly different angles. The brain of the user would then merge the two slightly dissimilar images into an impression of depth. This illusion of depth is what is commonly referred to as three-dimensional vision. To enhance this illusion, the inner surfaces of the top panel 28, the bottom panel 30, and the side walls 32 and 34 may be coated with a non-reflective, dark light absorbing substance such as a flat, black paint. In this manner, the user, when looking through the television viewing apparatus 10, gains the illusion of three-dimensional images.

One embodiment of the television viewing apparatus 10 which provides the above results, utilizes the following dimensions; however, it is to be recognized that these dimensions are merely illustrative of the invention and various modifications may be made without departing from the spirit and the scope of the invention.

| Element | Length | Height | Thickness | Radius of Curvature |
|---|---|---|---|---|
| 14 | 5" | 1 ¾" | — | — |
| 16 | 5" | 1 ¾" | — | — |
| 22 | 6 ¼" | 1 ¾" | 1/16" | 2 1/32" |
| 24 | 6 ¼" | 1 ¾" | 1/16" | 2 1/32" |
| 26 | 4 ½" | 1 ¾" | 1/16" | 2 1/32" |
| 50 | 14" | 1 ¾" | 1/16" | 2 1/32" |

It should be understood, of course, that the foregoing disclosure relates only to a preferred embodiment of the invention and that numerous modifications or alterations may be made therein without departing from the spirit and the scope of the invention as set forth in the appended claims.

What is claimed is:

1. A television viewing apparatus comprising:
   a housing means having a first aperture adapted for alignment with the eyes of the user and a second aperture adapted for alignment with a television screen;
   a first lens means positioned within said housing means and substantially adjacent to said first aperture wherein said first lens means includes a convex arcuate segment of transparent material said convexity being relative to said first aperture;
   a second lens means positioned within said housing means and substantially adjacent to said second aperture wherein said second lens means includes a first concave arcuate segment of transparent material said concavity being relative to said first aperture; and
   a third lens means intermediate to said first and second lens means wherein said third lens means includes a second concave arcuate segment of transparent material and a main chord, wherein said main chord of said third lens is parallel to a plane formed by said first aperture.

2. The apparatus of claim 1 wherein the radius of curvature of said convex arcuate segment is substantially equal to the radius of curvature of said first concave arcuate segment.

3. The apparatus of claim 2 wherein each end of said second concave arcuate segment is adjacent to the inner surface of said first convex arcuate segment.

4. The apparatus of claim 3 further comprising a first guide means connected to said housing means to position said first lens means a preselected distance from said first aperture and a second guide means connected to said housing means to position said second lens means a preselected distance from said second aperture.

5. The apparatus of claim 4 further comprising a third guide means connected to said housing means to position said third lens means adjacent to said first lens means.

6. The apparatus of claim 5 further comprising a fourth guide means connected to said housing means to effectuate the alignment of said television viewing apparatus with the eyes of said user.

7. The apparatus of claim 6 wherein said housing means comprises a hollow box like structure wherein said first aperture and said second aperture are spaced at opposite ends of said box like structure.

8. The apparatus of claim 7 wherein said first lens means and said second lens means are connected thereby forming a substantially cylindrical element having a radius equal to the radius of curvature of said convex arcuate segment.

9. A television viewing apparatus comprising:
   a housing means having a first aperture adapted for alignment with the eyes of the user and a second aperture adapted for alignment with a television screen;
   a transparent cylindrical element positioned within said housing whereby the longitudinal axis of said cylindrical element is substantially parallel to a plane formed by said first aperture; and
   a concave arcuate segment of transparent material including a main chord positioned within said cylindrical element wherein said main chord of said arcuate segment is parallel to said plane formed by said first aperture.

10. The apparatus of claim 9 further comprising a first guide means connected to said housing means to position each of the ends of said arcuate segment adjacent to the inner surface of said cylindrical element and whereby the ends of said arcuate segment form a plane parallel to said plane formed by said first aperture.

11. The apparatus of claim 10 wherein said housing means comprises:
   a first pair of parallel walls;
   a second pair of parallel walls each connected to said first pair of parallel walls wherein said first and said second pair of parallel walls cooperate to form said first and said second apertures.

* * * * *

UNITED STATES PATENT OFFICE
CERTIFICATE OF CORRECTION

Patent No. 3,680,949    Dated August 1, 1972

Inventor(s) Salvatore Davino

It is certified that error appears in the above-identified patent and that said Letters Patent are hereby corrected as shown below:

In the Abstract:

line 11, after "material" omit "and";

line 14, after "material" insert --whereby the three arcuate segments of transparent material--.

In the Specification:

Column 1, line 47, change "are" to --was-- after "which".

Signed and sealed this 23rd day of January 1973.

(SEAL)
Attest:

EDWARD M. FLETCHER, JR.
Attesting Officer

ROBERT GOTTSCHALK
Commissioner of Patents